(12) United States Patent
Schrader

(10) Patent No.: US 8,944,527 B2
(45) Date of Patent: Feb. 3, 2015

(54) BRAKE CYLINDER WITH PARKING BRAKE FUNCTION

(75) Inventor: Frank Schrader, Isernhagen/AWB (DE)

(73) Assignee: WABCO GmbH, Hannover (DE)

( * ) Notice: Subject to any disclaimer, the term of this patent is extended or adjusted under 35 U.S.C. 154(b) by 1200 days.

(21) Appl. No.: 11/792,474

(22) PCT Filed: Oct. 13, 2005

(86) PCT No.: PCT/EP2005/010984
§ 371 (c)(1),
(2), (4) Date: Jun. 5, 2007

(87) PCT Pub. No.: WO2006/074718
PCT Pub. Date: Jul. 20, 2006

(65) Prior Publication Data
US 2008/0106144 A1    May 8, 2008

(30) Foreign Application Priority Data
Jan. 11, 2005 (DE) .......................... 10 2005 001 234

(51) Int. Cl.
*B60T 17/16* (2006.01)
*F16D 123/00* (2012.01)
*F16D 127/06* (2012.01)
*F16D 129/10* (2012.01)

(52) U.S. Cl.
CPC ............. *B60T 17/16* (2013.01); *F16D 2123/00* (2013.01); *F16D 2127/06* (2013.01); *F16D 2129/10* (2013.01)
USPC .............................. 303/89; 188/265; 188/170

(58) Field of Classification Search
USPC ...... 188/166, 167, 170, 153 R, 153 D, 153 A, 188/265, 72.8; 303/9.76, 89; 92/62, 63, 92/130 R, 130 A
See application file for complete search history.

(56) References Cited

U.S. PATENT DOCUMENTS

| | | | | |
|---|---|---|---|---|
| 3,117,496 A | * | 1/1964 | Dobrikin | 92/63 |
| 3,744,596 A | * | 7/1973 | Sander | 188/203 |
| 3,943,829 A | * | 3/1976 | Newstead et al. | 92/29 |
| 4,226,168 A | * | 10/1980 | Staltmeir et al. | 92/130 A |
| 4,319,457 A | * | 3/1982 | Gross et al. | 60/593 |
| 5,148,894 A | | 9/1992 | Eddy, Jr. | |
| 5,632,192 A | * | 5/1997 | Plantan et al. | 92/5 L |

(Continued)

FOREIGN PATENT DOCUMENTS

| DE | 31 13 586 A1 | 10/1982 |
|---|---|---|
| DE | 195 19 310 A1 | 11/1996 |

(Continued)

*Primary Examiner* — Robert A Siconolfi
*Assistant Examiner* — Vu Q Nguyen
(74) *Attorney, Agent, or Firm* — Kramer Levin Naftalis & Frankel LLP

(57) ABSTRACT

A brake cylinder having a parking brake function includes a cylinder housing, a piston, and a piston tube for actuating a brake. A threaded bolt protruding into the piston tube and fixed to the cylinder housing by its upper end is used to effect the parking brake function. A clamping nut displaceable by means of a forked, axially rotatable driving element extends over the threaded bolt. The driving element is rotated with the clamping nut while the cylinder is subjected to pressure by the parking brake until the clamping nut is supported against the piston in the parking position of the piston. The piston is mechanically locked when the cylinder housing is not subjected to pressure.

12 Claims, 4 Drawing Sheets

(56) References Cited

U.S. PATENT DOCUMENTS

| | | | |
|---|---|---|---|
| 5,636,562 A * | 6/1997 | Choinski et al. | 92/63 |
| 6,012,556 A | 1/2000 | Blosch et al. | |
| 6,311,808 B1 | 11/2001 | Halasy-Wimmer et al. | |
| 2002/0171285 A1 * | 11/2002 | Nelander | 303/89 |
| 2003/0070888 A1 | 4/2003 | Baumgartner et al. | |

FOREIGN PATENT DOCUMENTS

| | | |
|---|---|---|
| DE | 196 48 581 A1 | 5/1998 |
| DE | 196 54 729 A1 | 7/1999 |
| DE | 199 06 228 A1 | 8/2000 |
| EP | 0 377 898 A1 | 7/1990 |
| EP | 0 526 273 A1 | 2/1993 |
| EP | 0 718 168 A1 | 6/1996 |
| WO | WO 00/08352 | 2/2000 |

* cited by examiner

BRAKE CYLINDER WITH PARKING BRAKE FUNCTION

BACKGROUND OF THE INVENTION

The present invention relates to a brake cylinder with parking brake function.

Brake cylinders of the general type under consideration function to actuate the brakes of a vehicle during service braking. Typically, compressed air is used to drive these brake cylinders, especially in commercial vehicles.

Brake cylinders of the general type under consideration may additionally take over the function of a parking brake. For a parking brake, it can be a regulatory requirement that the braking effect must be maintained even without the action of a pressurized fluid. Thus, the brake cylinder must be capable of being locked in its extended position, which position is also dependent on abrasion or wear of the brake linings, in order that the braking effect can be maintained in the unpressurized condition.

EP 0718168 A1 describes a brake cylinder for a compressed-air-actuated vehicle brake that is equipped with a releasable toothed mechanical locking device. This remains non-functional during service braking, but can be converted to locked position during auxiliary and/or parking braking. A disadvantage of this conventional brake cylinder is the relatively complicated design and the fact that the toothed mechanical locking device can be adjusted only incrementally.

EP 0377898 A1 describes a one-stage brake cylinder with a piston-rod clamping fixture. Infinitely variable clamping is made possible here by a conical clamping ring that presses on the piston rod to immobilize it in the end position (parking position) of the piston rod. An extra compressed-air line actuates the clamping ring. A disadvantage of this conventional brake cylinder is the relatively complicated design and the large radial forces produced due to clamping.

Brake cylinders of the type referred to as spring brake actuators are also known (see e.g., DE 3113586 A1). In such brake cylinders, a strong spring actuates the brake in the unpressurized condition of the spring actuator pressure chamber. To release the spring actuator, the spring is compressed by means of compressed air. Such spring actuators already, by their nature, have an integrated parking brake function. A releasing device is necessary for emergency release of the spring actuator if the compressed air fails. Spring brake actuators are relatively bulky and therefore are not particularly suitable for confined space conditions, such as exist on the front axles of commercial vehicles.

SUMMARY OF THE INVENTION

Generally speaking, in accordance with the present invention, a brake cylinder with parking brake function is provided that overcomes disadvantages associated with conventional brake cylinders.

The brake cylinder according to embodiments of the present invention includes a cylinder housing, a piston, and a piston tube for actuating the brake. A threaded bolt protruding into the piston tube and fixed to the cylinder housing by its upper end is used to effect the parking brake function. A clamping nut displaceable by means of a forked, axially rotatable driving element extends over the threaded bolt. The driving element is rotated with the clamping nut while the cylinder is subjected to pressure by the parking brake until the clamping nut is supported against the piston in the parking position of the piston. The piston is mechanically locked when the cylinder housing is not subjected to pressure.

By the use of the threaded bolt as well as the clamping nut that travels thereon and, in a lower end position, bears on the piston of the brake cylinder and immobilizes it in parking position, a simple and particularly reliable infinitely variable locking function is achieved. The drive of the clamping nut or the drive of the threaded bolt with fixed clamping nut can be provided in any desired manner, for example with an electric motor or with a paddle wheel and compressed-air drive. Since positioning of the clamping nut takes place only after the parking brake pressure has been established, only the friction of the clamping nut on the threaded bolt has to be overcome, and so small drive forces are sufficient.

The inventive locking is described in greater detail hereinafter with reference to a piston cylinder, but it should be understood that application with a membrane cylinder is also contemplated.

It is therefore an object of the present invention to provide a brake cylinder with parking brake function which effects reliable, mechanically simple, and infinitely variable immobilization in parking brake position.

It is a further object of the present invention to provide immobilization that is easily releasable for driving operation.

It is yet another object of the invention to provide a brake cylinder with parking brake function that is space-saving and cost-effective.

Still other objects and advantages of the present invention will in part be obvious and will in part be apparent from the specification.

The present invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

The present invention will be described in greater detail hereinafter on the basis of the accompanying drawings, wherein.

DETAILED DESCRIPTION OF THE PREFERRED EMBODIMENTS

Figure 1:
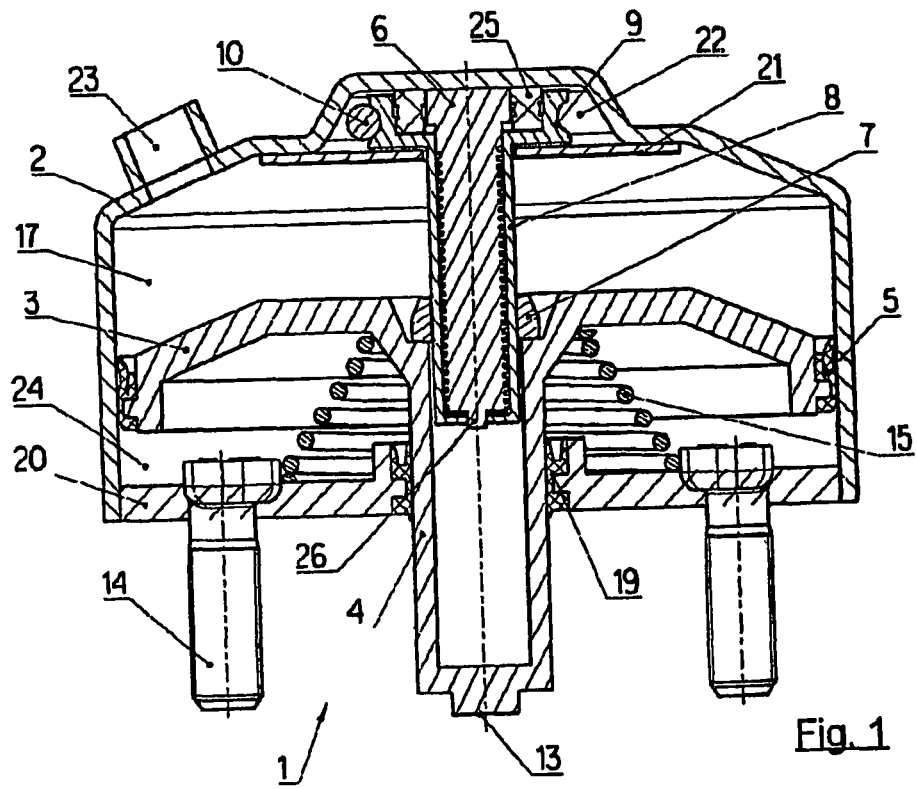
FIG. 1 is a sectional view of a brake cylinder with a fixed threaded bolt in accordance with an embodiment of the present invention.

Referring now to the drawings, where like and corresponding parts are represented with like reference numerals, FIG. 1 is a sectional view of a brake cylinder (1) with a fixed threaded bolt (6) in accordance with an embodiment of the present invention. Threaded bolt (6) is fastened at its upper end to cylinder housing (2) of brake cylinder (1). Brake cylinder (1) further includes a displaceable piston (3), which is sealed relative to cylinder housing (2) by means of a gasket and guide (5). Piston (3) is forced into its upper end position by means of a restoring spring (15).

As depicted in FIG. 1, when the piston (15) is in the lower end position or, in this case, parking position, a pressure space (17) between piston (3) and cylinder housing (2) has its maximum volume. In contrast, in this position a secondary space (24) under piston (3) has its minimum volume.

Brake cylinder (1) can be fastened to the vehicle using bolts (14), for example (e.g., to the brake housing of a disk brake).

A hollow piston tube (4) of piston (3) extends downwardly and is sealed from and guided relative to a flange (20) of brake cylinder (1) by means of a gasket and guide (19). A force interface (13) to a brake arm (not illustrated) of the disk brake is disposed at the lower end of piston tube (4). The force interface (13) enables actuation of the actual brake (not illustrated) in any desired manner. In other words, brake linings can be pressed by means of the brake arm against a friction face, such as a brake disk (not illustrated).

Compressed air can be admitted to or vented from pressure space (17) of the brake cylinder via a port (23).

To realize a parking brake function according to an embodiment of the present invention, threaded bolt (6), which protrudes into piston tube (4), is provided. A rotatable clamping nut (7) which can be rotated by a fork-shaped driver (8) is disposed on threaded bolt (6) (see FIGS. 3 and 4). Driver (8) passes through clamping nut (7) and, at its lower end, is guided by a pin (26) on threaded bolt (6).

At its upper end, driver (8) is fastened to a driver spindle (9). Driver spindle (9) is mounted to rotate by means of a bearing (25). Driver spindle (9) can be driven by a drive shaft (10). For this purpose, driver spindle (9) is constructed as a worm wheel and driver shaft (10) as a pinion or worm. A drive space (22) is hermetically isolated from pressure space (17) by a partition wall (21). In addition, drive shaft (10) is sealed relative to the outside.

The inventive brake cylinder according to the embodiment depicted in FIG. 1 functions as described below.

To engage the parking brake, compressed air is admitted into pressure space (17) via port (23). As a result, piston (3) is moved into a lower end position in which the brake linings (not illustrated) of the brake to be actuated bear on the brake disk or brake drum. In this way, the needed parking brake force can be achieved accurately by a variably adjustable parking brake pressure.

To fix the parking brake in position, drive shaft (10) is rotated, for example by an electric motor, and driver spindle (9) is also turned together with driver (8) fastened thereon. As a result, clamping nut (7) driven by driver (8) moves downward on fixed threaded bolt (6) to the indicated end position bearing on piston (3). In turn, piston (3) is immobilized in the last occupied parking brake position.

Compressed air can then be discharged from pressure space (17) without releasing the brake, and the parking brake function is achieved.

To release the parking brake, compressed air is re-introduced into pressure space (17) until clamping nut (7) is relieved of the force of piston (3). Thereafter, clamping nut (7) is returned to the upper end position on fixed threaded bolt (6) by rotation of drive shaft (10), and brake cylinder (1) is again ready for service braking.

Figure 2:
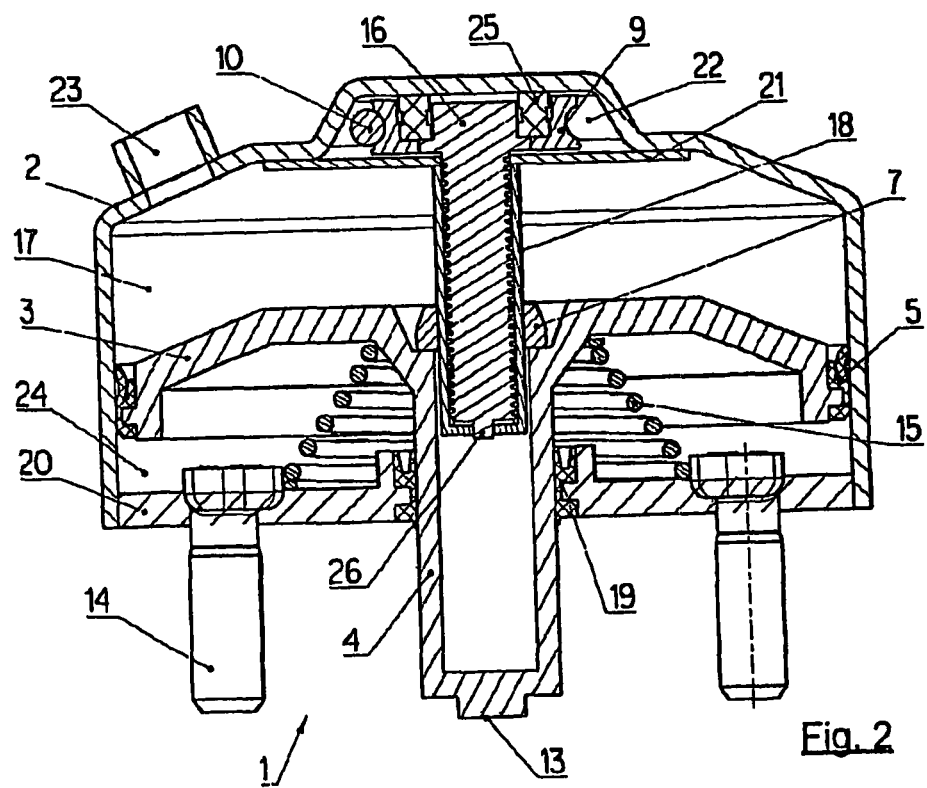
FIG. 2 is a sectional view of a brake cylinder with a rotatable threaded bolt in accordance with an embodiment of the present invention.

Brake cylinder (1) according to the embodiment depicted in FIG. 2 differs from that depicted in FIG. 1 as, in FIG. 2, clamping nut (7) is not rotatable but, rather, is secured from rotation by means of a fork-shaped guide rod (18). Guide rod (18) can be fastened to partition wall (21), for example. In the embodiment depicted in FIG. 2, threaded bolt (16) is permanently joined to driver spindle (9) and can be rotated by means of drive shaft (10). With the rotation of threaded bolt (16), clamping nut (7), which is secured from rotation, can be transported to lower and upper end positions. The mode of operation of the parking brake according to FIG. 2 corresponds in principle to that of FIG. 1.

Figure 3:
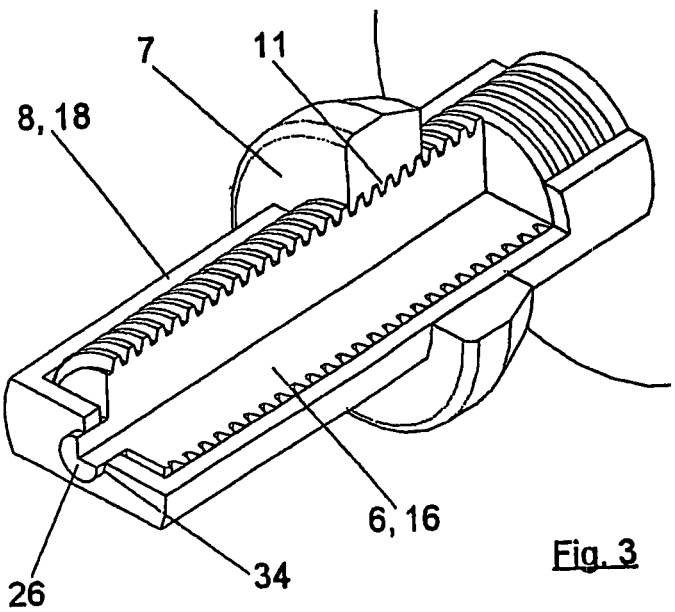
FIG. 3 is a perspective partial cutaway view of clamping nut, driver and central threaded bolt employed in an embodiment of the present invention.

FIG. 3 is a perspective partial cutaway view of clamping nut (7), driver (8) or guide rod (18) and central threaded bolts (6, 16). As described above, depending upon embodiment, clamping nut (7) is either rotatable (see FIG. 1) or is secured against rotation (see FIG. 2) by means of driver (8) or guide rod (18), respectively. Provided with female thread (11), clamping nut (7) encircles and threadably engages threaded stud (6, 16). A pin (26) at the lower end of fixed or rotatable threaded bolt (6, 16) passes through a bore (34) of driver (8) or guide rod (18) to guide or stabilize driver (8) or guide rod (18) as well as threaded bolt (6, 16).

Figure 4:
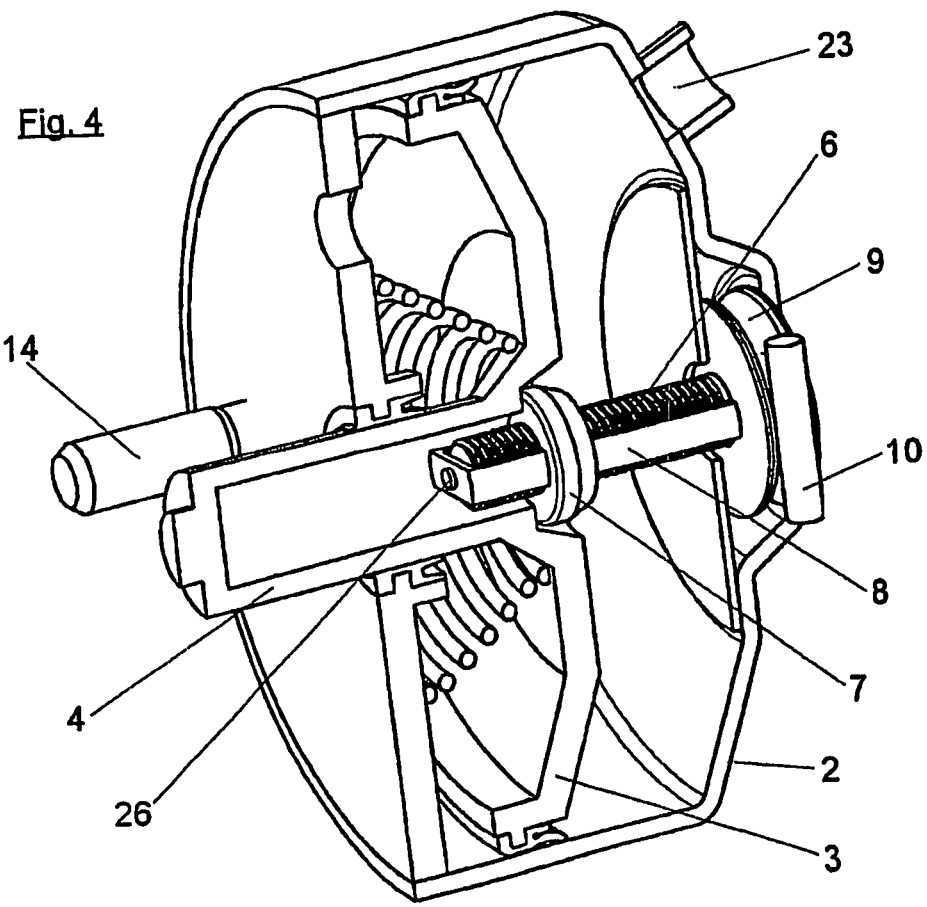
FIG. 4 is a perspective sectional view of the embodiment of the inventive brake cylinder depicted in FIG. 1.

FIG. 4 is a perspective sectional view of the embodiment of the brake cylinder depicted in FIG. 1. As in FIG. 1, threaded bolt (6), in this case, is fastened to cylinder housing (2), and clamping nut (7) can be rotated by means of driver (8) fastened to drive wheel (9). The other numbered parts correspond to those of FIG. 1.

FIGS. 5 to 8 show different advantageous drive options for fork-shaped driver (8) and rotatable threaded bolt (18), respectively.

Figure 5:
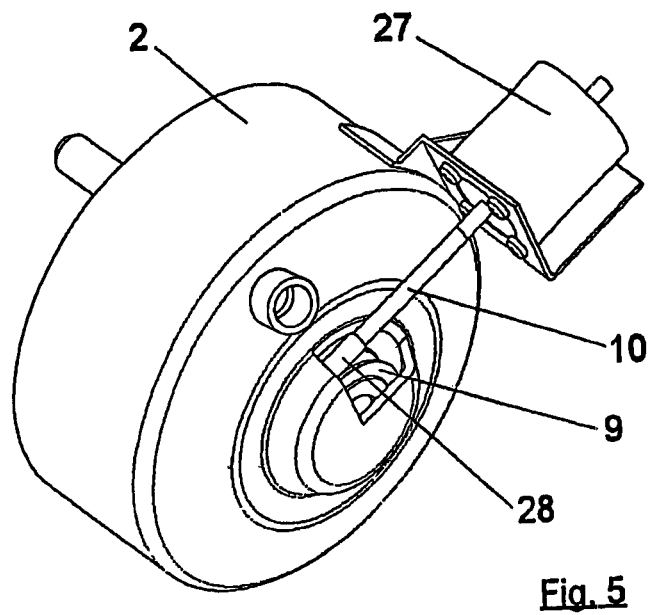
FIG. 5 is a perspective partial cutaway view of a drive having an electric motor and a drive shaft equipped with a worm gear employed in an embodiment of the present invention.

In FIG. 5, driver spindle (9) is driven via an electric motor (27) attached to the outside of cylinder housing (2). Electric motor (27) rotates driver spindle (9) via drive shaft (10), which is equipped with a pinion or a worm (28) and which is engaged in a corresponding tooth of driver spindle (9). Depending on direction of rotation, the parking brake can be engaged or released in this way. Because of the large reduction ratio permitted by the worm gear, a high-speed electric motor can be used.

Figure 6:
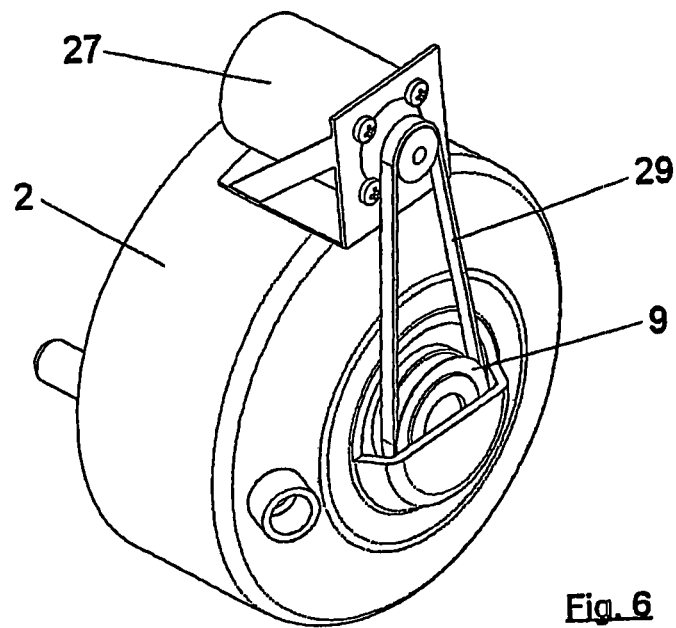
FIG. 6 is a perspective partial cutaway view of a drive having an electric motor and a belt drive employed in an embodiment of the present invention.

In FIG. 6, electric motor (27) rotates driver spindle (9) via a belt drive including a revolving belt (29) which connects electric motor (27) and driver spindle (9). For this purpose, driver spindle (9) is constructed as a drive pulley.

Figure 7:
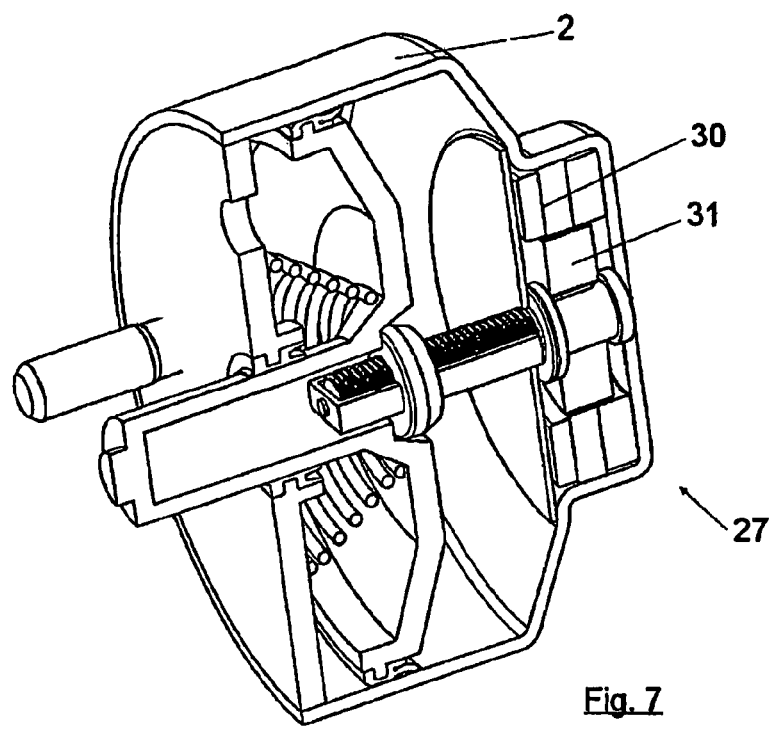
FIG. 7 is a perspective partial cutaway view of a drive having an integrated, coaxial electric motor employed in an embodiment of the present invention.

In FIG. 7, rotatable driver (8) (see FIG. 1) or rotatable threaded bolt (16) (see FIG. 2) is alternatively driven by a coaxial electric motor (27) disposed in cylinder housing (2). In this case, electric motor (27) includes an internal armature (31) equipped with magnets and an external winding (30).

Armature (31) is connected to driver (8) or to rotatable threaded bolt (16). To accommodate electric motor (27), cylinder housing (2) is provided with an outward bulge by which the overall length of brake cylinder (1) is somewhat increased. The advantage of this embodiment is that the electric motor is protected inside brake cylinder (1).

In the embodiments according to FIGS. 5 to 7, the current to electric motor (27) is cut off when clamping nut (7) has arrived in either the lower or upper end position. This can be expediently achieved by sensing the drive current of electric motor (27). If the drive current exceeds a predetermined value due to the mechanical resistance of clamping nut (7), it can be inferred that one of the end positions has been reached and, so, the current can be cut.

Alternatively, the increase in mechanical resistance at the end positions can also be detected by a separate force sensor installed, for example, in driver spindle (9) or in the force flow of the bracing components. As a further alternative, instead of an axial force sensor, a radial force sensor can be used to detect the torque of the drive.

As a further alternative, the drive current can be cut after a preselected time interval has elapsed. The preselected time interval is set such that clamping nut (7) will travel the complete distance on threaded bolt (16) during the set time.

Figure 8:
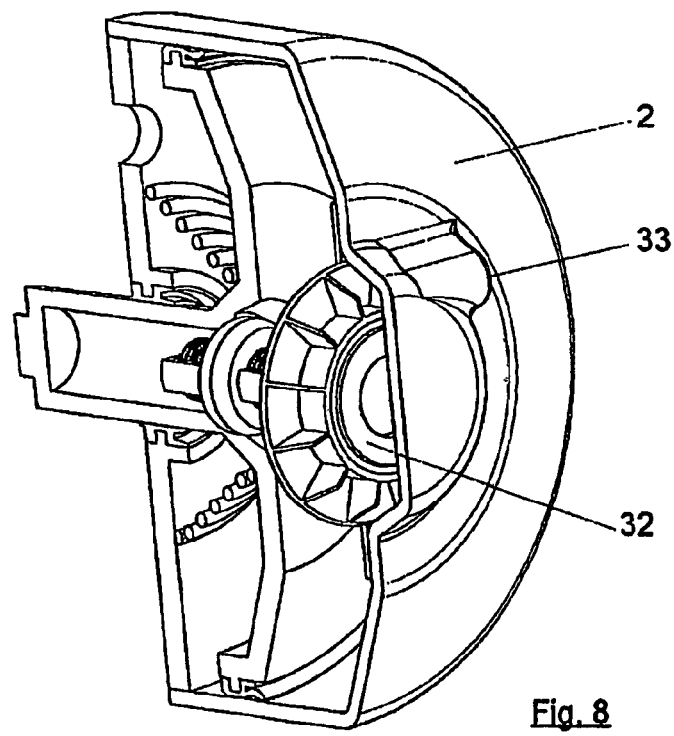
FIG. 8 is a perspective partial cutaway view of a compressed-air drive with paddle wheel employed in an embodiment of the present invention.

In the embodiment depicted in FIG. 8, driver spindle (9) is alternatively constructed as a paddle wheel (32). Paddle wheel (32) is driven by compressed air, which for one direction of rotation is supplied via a compressed-air port (33). For the opposite direction of rotation, a second port disposed opposite port (33) is used. The port opposite that by which compressed air is admitted functions as the respective air outlet. The duration of admission of compressed air can again be controlled as a function of time, as described above. Force sensing in the manner described above can also be provided.

The advantage of this embodiment is that the space requirement of brake cylinder (1) is reduced due to the elimination of exteriorly disposed parts.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A brake cylinder, comprising: a cylinder housing; a piston, said piston including a piston tube for actuation of a brake, said piston tube having an open end; a rotatable threaded bolt extending into said open end of said piston tube; a non-rotatable clamping nut that travels along said rotatable threaded bolt during rotary movement of said bolt and, at a lowermost position, bears against said piston proximate said open end of said piston tube to actuate said brake; a fixed guide rod, said clamping nut encircling each of said bolt and said guide rod such that each of said bolt and said guide rod passes through the clamping nut and contacts different portions of an inner surface of said clamping nut, said clamping nut remaining in contact with each of said bolt and said guide rod when said clamping nut travels along said bolt; and a drive for effecting said rotary movement of said rotatable threaded bolt.

2. The brake cylinder according to claim 1, further comprising a rotatable driver spindle fastened to an upper end of said rotatable threaded bolt for rotating said rotatable threaded bolt.

3. The brake cylinder according to claim 2, wherein said driver spindle is toothed and is driven via an external electric motor via a drive shaft including a worm.

4. The brake cylinder according to claim 2, wherein said driver spindle is driven via a revolving belt driven by an external electric motor.

5. The brake cylinder according to claim 2, wherein said driver spindle is constructed and arranged as a paddle wheel and is driven via compressed air.

6. The brake cylinder according to claim 2, wherein said driver spindle is driven via an electric motor and said motor is turned off at a preselected current flow increased by a mechanical resistance.

7. The brake cylinder according to claim 2, wherein said driver spindle is driven via an electric motor and said motor is turned off after a preselected time has elapsed.

8. The brake cylinder according to claim 1, wherein said rotatable threaded bolt is driven via a coaxial electric motor disposed in said cylinder housing.

9. The brake cylinder according to claim 1, wherein said drive is turned off when a preselected drive force is reached.

10. The brake cylinder according to claim 1, wherein said fixed guide rod is coupled to said rotatable threaded bolt.

11. The brake cylinder according to claim 1, further comprising a partition wall that separates said drive from said piston; and the fixed guide rod comprising (i) a first end fastened to said rotatable threaded bolt and (ii) a second end fastened to said partition wall.

12. The brake cylinder according to claim 1, wherein said bolt is in contact with a threaded portion of said inner surface, and wherein said guide rod is in contact with a portion of said inner surface adjacent said threaded portion.

* * * * *